United States Patent [19]

Martin et al.

[11] Patent Number: 5,171,801
[45] Date of Patent: Dec. 15, 1992

[54] PROCESS FOR OLEFIN POLYMERIZATION

[75] Inventors: Shirley J. Martin; Elizabeth A. Benham; Max P. McDaniel; Bruce W. Gerhold, all of Bartlesville, Okla.

[73] Assignee: Phillips Petroleum Company, Bartlesville, Okla.

[21] Appl. No.: 615,519

[22] Filed: Nov. 19, 1990

Related U.S. Application Data

[62] Division of Ser. No. 417,954, Oct. 6, 1989, Pat. No. 4,988,657.

[51] Int. Cl.$^5$ .............................................. C08F 4/24
[52] U.S. Cl. ................................... 526/106; 526/352; 502/158
[58] Field of Search ..................... 526/106; 502/158

[56] References Cited

U.S. PATENT DOCUMENTS

| | | | |
|---|---|---|---|
| 3,362,946 | 1/1968 | Hogan | 260/949 |
| 3,887,494 | 6/1975 | Dietz | 252/452 |
| 3,900,457 | 8/1975 | Witt | 260/94.9 D |
| 3,939,137 | 2/1976 | Hogan et al. | 526/106 |
| 4,014,816 | 3/1977 | Hogan et al. | 252/430 |
| 4,053,436 | 10/1977 | Hogan et al. | 252/452 |
| 4,151,122 | 4/1979 | McDaniel et al. | 526/106 |
| 4,238,369 | 12/1980 | McDaniel et al. | 252/458 |
| 4,247,421 | 1/1981 | McDaniel et al. | 252/458 |
| 4,294,724 | 10/1981 | McDaniel | 252/451 |
| 4,392,990 | 7/1983 | Witt | 252/458 |
| 4,405,501 | 9/1983 | Witt | 252/452 |

Primary Examiner—Joseph L. Schofer
Assistant Examiner—Tom Weber
Attorney, Agent, or Firm—Lynda S. Jolly

[57] ABSTRACT

Olefins are polymerized with a catalyst composition which forms on mixing a supported chromium oxide catalyst system and a silane compound. This composition allows the production of one or more comonomers in-situ. The resultant polymer has a lower density, a higher melt index, and a higher high load melt index than polymers produced with a similar catalyst system in the absence of a silane compound.

20 Claims, No Drawings

PROCESS FOR OLEFIN POLYMERIZATION

This application is a divisional of application Ser. No. 07/417,954, filed Oct. 6, 1989, now U.S. Pat. No. 4,988,657.

BACKGROUND OF THE INVENTION

This invention relates to the polymerization of a mono-1-olefin, such as ethylene, using a catalyst system comprising a supported chromium oxide catalyst.

Supported chromium catalysts have long been a dominate factor in the production of high density olefin polymers such as polyethylene. As originally commercialized, these catalysts were used in solution polymerization processes. However, it really became evident that a more economical route to many commercial grades of olefin polymers was a slurry process, that is, a polymerization process carried out at a temperature low enough that the resulting polymer is largely insoluble in the diluent. However, certain control techniques which are easily carried out in solution polymerization systems became more difficult in the slurry, or particle form, system. This is particularly true with regard to control of the molecular weight of the polymer. In a solution system, the temperature can be increased in order to provide a lower molecular weight and a higher melt flow polymer. However, in slurry systems, there is a practical limit on temperature increases, since the point is quickly reached wherein the polymer goes into solution and thus the value of the slurry system is lost.

It is also known that mono-1-olefins, such as ethylene, can be polymerized with catalyst systems employing vanadium, chromium, or other metals on a support such as alumina, silica, aluminum phosphate, titania, ziconia, magnesia, or other refractory metal oxides. Initially such catalysts were used primarily to form homopolymers of ethylene. It soon developed, however, that many applications required polymers which were more impact resistant than ethylene homopolymers. Consequently, in order to produce a polymer having short chain branching like the more flexible, free radical polymerized ethylene polymers, comonomers such as propylene, butene, hexene or other higher olefins were copolymerized with the ethylene to provide resins tailored to specific end uses. Copolymers, however, are more expensive to produce since inventories of different monomers must be kept and also the comonomers are generally more expensive than ethylene. Linear ethylene polymers with short chain branching can be formed from a pure ethylene feed using the old free radical high pressure process, but the conditions necessary to do this make the product too expensive to be commercially competitive.

Additional control over the polymerization process and the resultant polymer is also desired. A process to consistently reduce the density of linear ethylene polymers and to more efficiently produce and incorporate comonomers into the linear ethylene polymer is economically advantageous.

SUMMARY OF THE INVENTION

Accordingly it is an object of this invention to provide a low cost route to linear ethylene polymers having toughness imparted by short chain branching.

It is a further object of this invention to provide a process by which ethylene polymers having the properties associated with copolymers of ethylene and other higher alpha olefins can be obtained from a pure ethylene feedstock.

It is yet a further object of this invention to provide an improved polymerization process.

It is a further object of this invention to provide a novel polymerization process to control polymer density.

It is yet another object of this invention to provide a novel polymerization process to improve comonomer production and incorporation into ethylene polymers.

In accordance with this invention, an essentially ethylene feed is contacted under polymerization conditions with a catalyst system comprising a catalyst which comprises chromium in the form of chromium oxide, supported on a refractory metal oxide and a silane compound with the formula $R_{4-n}SiH_n$, wherein n is an integer from 1 to 4. In accordance with another embodiment of this invention the catalyst, after activation in an oxygen-containing ambient, is reduced with carbon monoxide prior to contacting the silane compound.

DESCRIPTION OF THE PREFERRED EMBODIMENTS

Catalysts

The catalyst support can be any conventional polymerization catalyst support. Preferably, one or more refractory metal oxides comprise the catalyst support. Exemplary refractory metal oxides include, but are not limited to alumina, boria, magnesia, theoria, ziconia, silica, or mixtures thereof. The catalyst support can be prepared in accordance with any method known in the art. Exemplary support method preparations are given in U.S. Pat. Nos. 3,887,494; 3,900,457; 4,053,436; 4,151,122; 4,294,724; 4,392,990; and 4,405,501, herein incorporated by reference.

In the description herein the terms "cogel" and "cogel hydrogel" are arbitrarily used to describe cogelled silica and titania. The term "tergel" is used to describe the product resulting from gelation together of silica, titania, and chromium. "Hydrogel" is defined as a support component containing water. "Xerogel" is a support component which has been dried and is substantially water-free. References to "silica" mean a silica-containing material, generally composed of 80 to 100 weight percent silica, the remainder, if any, being selected from the group consisting of alumina, boria, magnesia, thoria, zirconia, or mixtures thereof. Other ingredients which do not adversely effect the catalyst or which are present to produce some unrelated results can also be present.

The catalyst component must be a chromium compound. The chromium component can be combined with the support component in any manner known in the art, such as forming a co-precipitated tergel. Alternatively, an aqueous solution of a water soluble chromium component can be added to the hydrogel of the support component. Suitable chromium compounds include, but are not limited to, chromium nitrate, chromium acetate, and chromium trioxide. Alternatively, a solution of a hydrocarbon soluble chromium component, such as tertiary butyl chromate, a diarene chromium compound, biscyclopentadienyl chromium II or chromium acetyl acetonate, can be used to impregnate the xerogel support, which results from removal of water from the hydrogel.

The chromium component is used in an amount sufficient to give about 0.05 to about 5, preferably about 0.5 to about 2 weight percent chromium based on the total weight of the chromium and support after activation.

The resulting chromium component on the support component is then subjected to activation in an oxygen-containing ambient in a manner conventionally used in the art. Because of economy, the preferred oxygen containing ambient is air, preferably dry air. The activation is carried out at an elevated temperature for about ½ to about 50 hours, preferably about 2 to about 10 hours, at a temperature within the range of about 400° to about 900° C. Under these conditions, at least a substantial portion of any chromium in the lower valent state is converted to the hexavalent form by this calcination procedure.

A preferred, second type of chromium catalyst is prepared when the resulting previously calcined, supported catalyst is then cooled and subjected to at least a partial reduction of the hexavalent chromium to a lower valent state prior to contacting the silane compound. Preferably, a substantial portion of the chromium will be in the divalent state after the reduction process.

The reducing agent must be carbon monoxide. The reducing agent can be employed at temperatures between about 300° to about 500° C. although it is more often employed at temperatures in the range of about 350° to about 450° C. The partial pressure of the reducing gas in the reduction operation can be varied from sub-atmospheric pressures to relatively high pressures, but the simplest reducing operation is to utilize a dilute solution of a pure reducing agent at about atmospheric pressure. Usually, a solution of about 10%, by volume, carbon monoxide in an inert ambient, such as, for example, nitrogen and/or argon can be used.

The reduction time can vary from a few minutes to several hours or more. The extent of reduction can be followed by visual inspection of catalyst color. The color of the initial oxygen-activated catalyst is generally orange, indicating the presence of hexavalent chromium. The color of the reduced catalyst employed in the invention is blue, indicating that all or substantially all of the initial hexavalent chromium has been reduced to lower oxidation states, generally the divalent state.

The course of the reduction action of the air-activated orange catalyst with the reducing agent can be determined exactly by pulse tritation. A known amount of reducing agent is added per pulse and the amount of evolved oxidized reducing agent is measured. When reduction is complete, only reducing agent will be present and the catalyst is blue in color. The blue reduced catalyst can be tritated with pulses of oxygen or any oxidizing agent, to convert the catalyst to the original orange color. When oxidation is complete the oxidizing agent will be evident in the off gas.

After reduction, the reduced, supported catalyst component is cooled to about room temperature, e.g. about 25° C., in an inert atmosphere, such as argon or nitrogen, to flush out the reducing agent. After the flushing treatment, the catalyst is kept away from contact with either the reducing agent or an oxidizing agent.

Catalyst concentrations in the reactor are conventional and are usually within the range of about 0.001 to about 10 weight percent, based on the weight of active chromium and the weight of the reactor contents.

Silane Treatment

Silane compounds useful in this invention are any silane compound with the formula $R_{4-n}SiH_n$, where n is an integer from 1 to 4. Therefore, the silane compound must have at least one Si—H bond. R can be the same or different and can be any aliphatic and/or aromatic radical with one or more carbon atoms. The silane compound of the formula $SiH_4$, i.e., wherein n=4, can be effectively used to treat the oxidized only catalyst, as well as the oxidized and reduced catalyst. If the silane compound is an organic silane comprising at least one R group, i.e., wherein n=1, 2, or 3, treatment is effective only with the oxidized and reduced catalyst.

Exemplary silane compounds include, but are not limited, to ethylsilane, diethylsilane, triethylsilane, phenylsilane, diphenylsilane, triphenylsilane, n-hexylsilane, poly(hydroxymethyl)siloxane, and mixtures thereof. Preferred silane compounds include, but are not limited to, diethylsilane, phenylsilane, n-hexylsilane, and mixtures thereof, in that they appear to have a more dramatic effect on the catalyst and the resultant polymer.

Use of the silane compound can be regarded as a catalyst treatment and/or a cocatalyst. For simplification of terms in this application, the terms "treating" or "treatment" are meant to incorporate the term cocatalyst. The silane compound can be contacted either with the catalyst prior to catalyst use or can be added to the polymerization reactor at any time during the polymerization reaction. However, for maximum benefit, the catalyst preferably is exposed to the silane compound prior to contacting the olefin monomer. Therefore, the silane and catalyst most preferably are precontacted prior to introduction into the polymerization reactor, or the silane and catalyst can be precontacted in the polymerization reactor prior to the introduction of any olefin.

When the silane is added directly to the polymerization reactor, the silane usually is added in a hydrocarbon solution, with the hydrocarbon usually being the same as the solvent contained in the reactor, but is not restricted to that solvent. Dilute solutions, i.e., about 0.005 to about 1 weight percent, are conveniently used when passing the silane solution into the reactor. If the silane and catalyst are precontacted prior to introduction to the polymerization reactor, a more concentrated silane solution can be used. After precontacting the catalyst and silane, it is desirable to thoroughly mix the silane solution and the catalyst.

The amount of silane used to treat the catalyst is any amount sufficient to produce one or more comonomers in-situ, i.e., in the polymerization reactor. Usually, about 0.1 to about 10 ppm, preferably about 0.1 to about 4 ppm silane compound is added to the polymerization reactor. Most preferably, about 0.5 to about 2 ppm is added to the polymerization reactor to achieve the greatest density decrease, an increased melt index (MI), and an increased high load melt index (HLMI).

Expressed in equivalent, but different, terms the amount of silane compound employed can be given as a molar ratio of moles of silane to moles of active chromium in the catalyst. Generally, a molar ratio of silane to chromium of about 0.005 to about 6, and preferably about 0.3 to about 3, can be used. Most preferably, the silane to chromium molar ratio is within the range of about 0.5 to about 2 for the reasons given above.

An additional equivalent method of expressing the amount of silane used to treat the chromium catalyst is in terms of weight percent. Generally, about 0.1 to about 16 weight percent, and preferably about 0.3 to about 8 weight percent, based on the weight of the silane per weight of the total catalyst, that is, the support plus the chromium compound and excluding the silane, is used. Most preferably about 0.5 to about 4 weight percent of silane compound is used for the reasons given above.

The treating time, temperature, and pressure are those sufficient to obtain production of one or more comonomers in-situ. When an organic silane is used to pre-treat an oxidized and then reduced catalyst system, usually, times of about 10 seconds to about 1 hour, and preferably about 1 minute to about 30 minutes are used. Treatment temperatures can range from about 25° to about 100° C., and preferably from about 25° to about 50° C. Pressures can range from about 1 to about 100 atmospheres and preferably from about 25 to about 60 atmospheres. However, when silane ($SiH_4$) alone is used, the above-given parameters can vary. Additionally, these parameters can vary if the silane compound is added directly to the polymerization reactor.

The treating ambient must be in an inert, or non-oxidizing and/or non-reducing, atmosphere. Exemplary ambients include, but are not limited to nitrogen and/or argon.

Polymer Characteristics

The polymers produced in accordance with this invention have reduced density, broadened molecular weight distribution especially on the low molecular weight side, an increased MI, and an increased HLMI. This catalyst composition is most preferably applicable for use with ethylene polymerization, for best in-situ comonomer production.

The addition of the silane compound will usually result in a polymer with a density within the range of about 0.91 to about 0.96 g/cc, and preferably within the range of about 0.92 to about 0.945 g/cc. The MI is usually within the range of about 0.015 to about 0.7 and preferably within the range of about 0.02 to about 0.5. The HLMI of the resultant polymer will usually be within the range of about 1 to about 175 and preferably within the range of about 4 to about 70. The ratio of the HLMI/MI is usually within the range of about 40 to about 250, and preferably within the range of about 50 to 150. Polymers with characteristics within the given ranges are especially useful for applications of blow molding and/or film production.

Reaction Conditions

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle form or slurry process wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within the range of about 185° to about 230° F. (85° to 110° C.). Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium catalyst which has not been subjected to the reduction step can be utilized either before or after the reactor utilizing the catalyst system of this invention. In another specific instance, a conventional chromium oxide on a perdominantly silica support can be utilized in a reactor in parallel with a reactor utilizing the catalyst system of this invention and the resulting polymerization influence combined prior to recovering and polymer.

Commonly used polymerization cocatalysts can be used, if desired, but are not necessary. However, the use of a metal alkyl cocatalyst, i.e., alkyl boron and/or alkyl aluminum compounds do not appear to produce a significant additive density reduction effect.

The molecular weight of the polymer can be controlled by various means known in the art such as adjusting the temperature (higher temperature giving lower molecular weight) and introducing additional hydrogen to lower the molecular weight or varying the catalyst compounds.

EXAMPLES

The following examples illustrate various aspects of the invention. Data are included for each example about the polymerization conditions, as well as the resultant polymer. Unless otherwise indicated, the polymerizations were completed in a 2 liter autoclave reactor at 95° C. using an isobutane slurry. Approximately 0.06 gram of catalyst was charged to the reactor; then 0.5 liters of isobutane were added. The silane compound, in a solution of 0.5% by weight in heptane, was then added and an additional 0.5 liters of isobutane were used to flush in the silane solution. The catalyst was mixed with the silane compound in the reactor for approximately 10 minutes before the ethylene was added for a final pressure of 550 psig. Ethylene concentration in the loop-type polymerization reactor in every run was about 7 to about 8 weight percent. The polymerization time usually was for about 30 to about 60 minutes.

The catalysts used were 969MS catalysts available from Davison Chemical Company, a division of W. R. Grace, and are 1 weight percent chromium on a Grace, grade 952, silica, prepared in accordance with U.S. Pat. No. 3,887,494. The catalyst used in Example 2 was activated in air at 760° C. for 3 hours. The catalysts used in Examples 3–10 were activated in air for 3 hours at 760° C., then cooled to 370° C., flushed with nitrogen and reduced in CO at 370° C. for 30 minutes, and finally flushed with nitrogen.

Polymer density was determined in grams per cubic centimeter (g/cc) on a compression molded sample, cooled at about 15° C. per hour, and conditioned for about 40 hours at room temperature in accordance with ASTM D1505 and ASTM D1928, condition C. The high load melt index (HLMI) was determined in accordance with ASTM D1238 at 190° C. with a 21,600 gram weight. Melt index (MI) was determined according to ASTM D1238 at 190° C. with a 2,160 gram weight. Inherent viscosity (IV) was determined in deciliters per gram (dl/g) according to ASTM D1601, using 1,2,4-trichlorobenzene as the solvent, a temperature of 140° C., and a sample concentration of 0.015 g/dl, on a Ubbelohde viscometer. Size exclusion chromatography (SEC) analyses were performed at 140° C. on a Waters, model 150 GPC with an infrared detector. A solution concentration of 0.25 weight percent in 1,2,4-trichlorobenzene was found to give reasonable elution times.

EXAMPLE I

The polymerizations in this example were performed as previously described, however the catalysts were treated with an excess of SiH$_4$ gas before entry into the reactor. No additional silane compound(s) were added subsequently to the reactor. In Runs 101-113, approximately 30 ml of catalyst, prepared in accordance with U.S. Pat. No. 3,887,494, were preactivated under varying conditions as shown in Table I. 15 ml of each catalyst were transferred, under nitrogen, to a dry quartz activator tube. SiH$_4$ gas, diluted with nitrogen, was passed through the catalyst bed at room temperature. The nitrogen flow was decreased until pure SiH$_4$ was used. Then the tube was flushed with nitrogen to remove the excess SiH$_4$.

The catalyst in Runs 101 and 102 was preactivated at 300° C. The temperature of the catalyst bed increased by 1.8° C. with the addition of the SiH$_4$ and N$_2$ mixture. The color of the catalyst changed, but it still had an orange tint.

The catalyst in Runs 103-105 was preactivated at 300° C. and then CO reduced at 300° C. This catalyst only had a very slight temperature increase. The color of the catalyst changed very little.

The catalyst in Runs 106-109 was preactivated at 600° C. It was a yellow-orange color. The total temperature change during SiH$_4$ treatment was 6.9° F. The catalyst turned a greenish-black color.

The catalyst in Runs 110-113 was preactivated at 600° C. Then CO reduced at 350° C. The catalyst was a blue-green color. The total temperature change during SiH$_4$ treatment was 23.7° F. The catalyst turned black. The results are given in Table 1.

TABLE 1

SiH$_4$ Treated Catalysts

| Run | Activation Temp °C. | Gas | Temp °C. | Gas | SiH$_4$ | Polymerization Temp °C. | Productivity[a] (g/g-hr) | Comments | MI |
|---|---|---|---|---|---|---|---|---|---|
| 101 | 300 | Air | — | — | None | 95 | 201 | No olefins | 0.008 |
| 102 | 300 | Air | — | — | Yes | 95 | 121 | No olefins | — |
| 103 | 300 | Air | 300 | CO | None | 95 | 37 | No olefins | 0.007 |
| 104 | 300 | Air | 300 | CO | Yes | 95 | 20 | No olefins | — |
| 105 | 300 | Air | 300 | CO | Yes | 105 | 98 | No olefins | 0.025 |
| 106 | 600 | Air | 350 | CO | None | 100 | 1866 | — | — |
| 107 | 600 | Air | 350 | CO | Yes | 100 | 122 | Made olefins | — |
| 108 | 600 | Air | 350 | CO | Yes | 95 | 218 | Made olefins | 0.58 |
| 109 | 600 | Air | 350 | CO | Yes | 80 | 211 | Waxy + olefins | 0.03 |
| 110 | 600 | Air | — | — | None | 95 | 1393 | No olefins | 0.022 |
| 111 | 600 | Air | — | — | Yes | 95 | 1076 | Made olefins | 0.47 |
| 112 | 600 | Air | — | — | Yes | 80 | 957 | — | 0.013 |
| 113 | [b]600 | Air | — | — | Yes | 95 | 1220 | No olefin odor | 0.012 |

| Run | HLMI | HLMI/MI | Density (g/cc) | Mw × 10$^3$ | Mn × 10$^3$ | HI | IV (dl/g) |
|---|---|---|---|---|---|---|---|
| 101 | 2.2 | 276 | 0.9613 | — | — | — | — |
| 102 | 1.6 | — | 0.9603 | — | — | — | — |
| 103 | 0.35 | 48 | 0.9699 | — | — | — | — |
| 104 | 0.54 | — | 0.9776 | — | — | — | — |
| 105 | 3.5 | 140 | 0.9593 | — | — | — | — |
| 106 | 3.04 | — | 0.9579 | — | — | — | 3.57 |
| 107 | — | — | 0.9227 | 184 | 2.7 | 67.1 | 1.72 |
| 108 | 37 | 63 | 0.9277 | 201 | 2.7 | 74.5 | 2.59 |
| 109 | 5.5 | 182 | 0.9399 | — | — | — | 4.18 |
| 110 | 2.3 | 106 | 0.9594 | — | — | — | 3.36 |
| 111 | 29 | 62 | 0.9287 | 249 | 9.6 | 26.1 | 2.41 |
| 112 | 1.7 | 131 | 0.9356 | — | — | — | — |
| 113 | 1.4 | 119 | 0.9617 | — | — | — | — |

[a]Solid polymer recovered from reactor.
[b]Catalyst reactivate in air at 600° after silane treatment.

Table I lists results from catalysts which were treated with gaseous SiH$_4$ in an activator tube. Samples calcined at 300° C., Runs 101 and 102, were not further activated by the silane treatment. Samples calcined at 300° C. and reduced with CO at 350° C., Runs 103-105, also were not further activated by the silane treatment.

When the catalyst was calcined in the normal range, i.e. at 600° C., the SiH$_4$ treatment did have a promotional effect. Both the oxidized only, and the oxidized and reduced catalysts produced olefins after the treatment, which supressed polymer density even into the 0.92 range. This was especially true of the oxidized and reduced catalyst, Runs 106-109. While not wishing to be bound by theory, it is believed that the decreased activity is probably the result of polymer swelling, since the reactor temperature was too high for this density range.

EXAMPLE 2

Substituted organic silanes were used to treat oxidized only catalysts. Both diethyl silane and triethyl silane, which were used, are very effective silanes. The results of this treatment are given in Table 2.

TABLE 2

Silanes with Oxidized-Only Catalysts

| Run | Silane | Silane (mmoles) | (ppm) | Productivity[a] (g/g-hr) | MI | HLMI | HLMI/MI | Density (g/cc) |
|---|---|---|---|---|---|---|---|---|
| 201 | None | 0.0 | 0 | 2326 | 0.026 | 4.7 | 181 | 0.9606 |
| 202 | Diethylsilane | 0.000855 | 0.1 | 2734 | 0.0066 | 2.7 | 416 | 0.9591 |

TABLE 2-continued

| | | Silanes with Oxidized-Only Catalysts | | | | | |
|---|---|---|---|---|---|---|---|
| | | Silane | | Productivity[a] | | | Density |
| Run | Silane | (mmoles) | (ppm) | (g/g-hr) | MI | HLMI | HLMI/MI | (g/cc) |
| 203 | Diethylsilane | 0.0034 | 0.5 | 1870 | — | 2.2 | — | 0.9594 |
| 204 | Diethylsilane | 0.0103 | 2.0 | Trace | — | — | — | — |
| 205 | Triethylsilane | 0.0103 | 2.0 | 34 | — | — | — | — |

[a]Solid polymer recovered from reactor.

The data in Table 2 show that the effect of density suppression was not observed by adding an organic silane to the reactor with an oxidized only catalyst.

EXAMPLE 3

Diethylsilane was used in conjunction with an oxidized and reduced catalyst. The results, in Table 3, show that olefins, other than ethylene, were produced. Additionally, density was suppressed and activity was enhanced.

TABLE 3

| | | | | | | | | | | SEC | | | IV |
|---|---|---|---|---|---|---|---|---|---|---|---|---|---|
| | Silane | | Productivity[a] | Count[b] Productivity | | | | HLM/ | Density | | | | |
| Run | (mmoles) | (ppm) | (g/g-hr) | (g/g-hr) | Comments | MI | HLMI | MI | (g/cc) | Mw × 10³ | Mn × 10³ | HI | (dl/g) |
| 301 | 0 | 0 | 2326 | 2326 | No olefins | 0.026 | 4.7 | 181 | 0.9606 | 230 | 5.3 | 15.1 | 2.32 |
| 302 | 0.000855 | 0.1 | 4040 | 4003 | Slight olefin odor | 0.0046 | 1.3 | 275 | 0.9485 | — | — | — | — |
| 303 | 0.00171 | 0.2 | 3333 | 3434 | Olefin odor | 0.033 | 3.4 | 103 | 0.9458 | — | — | — | — |
| 304 | 0.00257 | 0.3 | 3687 | 3687 | Strong odor | 0.017 | 4.0 | 233 | 0.9420 | 203 | 15.2 | 13.3 | 2.11 |
| 305 | 0.0034 | 0.5 | 2751 | 2901 | Strong odor | 0.44 | 24.7 | 56 | 0.9235 | 121 | 11.1 | 10.9 | 1.57 |
| 306 | 0.0068 | 1.0 | 1142 | 1899 | Waxy, strong odor! | 0.88 | 64.1 | 73 | 0.9204 | — | — | — | — |
| 307 | 0.017 | 2.5 | 412 | 803 | Waxy, strong odor! | 0.54 | 49.3 | 91 | 0.9357 | — | — | — | — |
| 308 | 0.034 | 5.0 | 378 | 597 | Waxy, strong odor! | 0.70 | 164.0 | 233 | 0.9305 | 211 | 2.5 | 83.0 | 2.34 |
| 309 | 0.0068[c] | 1.0 | 1461 | 2216 | Strong odor | 0.062 | 9.8 | 157 | 0.9314 | — | — | — | — |
| 310 | 0.017[c] | 2.5 | 710 | 1582 | Strong odor | 0.095 | 73.0 | 770 | 0.9348 | — | — | — | — |

[a]Solid polymer recovered from reactor.
[b]Total ethylene consumed.
[c]Polymerizations made at 85° C.

EXAMPLE 4

Example 4 shows the simultaneous use of metal alkyl, triethylaluminum (TEA), and an organic silane. The results, in Table 4, indicate that an in-situ olefin production effect is not additive.

TABLE 4

| | | Silane and TEA with Oxidized and Reduced Catalyst | | | | | |
|---|---|---|---|---|---|---|---|
| | | TEA | Silane | | Productivity[a] | Count[b] Productivity | |
| Run | Silane | (mmoles) | (mmoles) | (ppm) | (g/g-hr) | (g/g-hr) | Comments |
| 410 | None | 0.00428 | 0.0 | 0 | 1672 | 1672 | No olefin odor |
| 402 | diethylsilane | 0.0053 | 0.0085 | 1.25 | 1470 | 2466 | Waxy, strong olefin odor |
| 403 | diethylsilane | 0.00171 | 0.00171 | 0.2 | 2840 | 2791 | Slight olefin odor |
| 404 | diethylsilane | 0.00428 | 0.00428 | 0.6 | 2529 | 3191 | Waxy, strong olefin odor |
| 405 | diethylsilane | 0.00428 | 0.00428 | 0.83 | 2494 | 2781 | Waxy, strong olefin odor |
| 406 | diphenylsilane | 0.00428 | 0.00428 | 1.34 | 2547 | 2752 | Olefin odor |
| 407 | phenylsilane | 0.00428 | 0.00428 | 0.77 | 1522 | 1870 | Strong olefin odor |

| Run | MI | HLMI | HLMI/MI | Density (g/cc) | IV (dl/g) |
|---|---|---|---|---|---|
| 410 | 0.0017 | 0.9 | 533 | 0.9534 | 3.41 |
| 402 | 0.25 | 31.5 | 125 | 0.9190 | — |
| 403 | 0.0082 | 1.2 | 146 | 0.9486 | — |
| 404 | 0.16 | 13.7 | 83 | 0.9285 | — |
| 405 | 0.13 | 9.9 | 78 | 0.9313 | — |
| 406 | 0.04 | 4.1 | 86 | 0.9373 | — |

TABLE 4-continued

| | | | | | |
|---|---|---|---|---|---|
| Silane and TEA with Oxidized and Reduced Catalyst | | | | | |
| | 407 | 0.18 | 18.7 | 106 | 0.9342 | — |

[a] Solid polymer recovered from reactor.
[b] Total ethylene consumed.
[c] Polymerizations made at 85° C.

EXAMPLE 5

The use of triethylsilane with an oxidized and reduced catalyst is shown to result in a beneficial effect in Table 5.

EXAMPLE 6

The use of diphenylsilane with an oxidized and reduced catalyst is shown to result in a desirable manner in Table 6.

TABLE 5

Triethylsilane with Oxidized and Reduced

| | Silane | | Productivity[a] | Count[b] Productivity | | | | HLMI/ | Density | SEC | | | IV |
|---|---|---|---|---|---|---|---|---|---|---|---|---|---|
| Run | (mmoles) | (ppm) | (g/g-hr) | (g/g-hr) | Comments | MI | HLMI | MI | (g/cc) | $Mw \times 10^3$ | $Mn \times 10^3$ | HI | (dl/g) |
| 501 | 0 | 0 | 2326 | 2326 | No olefins | 0.026 | 4.7 | 181 | 0.9606 | 230 | 15.3 | 15.1 | 2.32 |
| 502 | 0.00103 | 0.2 | 881 | 881 | No olefins | 0.019 | 2.6 | 135 | 0.9532 | — | — | — | — |
| 503 | 0.00258 | 0.5 | 2024 | 2238 | Olefin odor | 0.027 | 3.0 | 109 | 0.9471 | 208 | 16.1 | 12.9 | 2.48 |
| 504 | 0.00515 | 1.0 | 1207 | 1512 | Strong olefin odor | 0.19 | 15.0 | 79 | 0.9370 | — | — | — | — |
| 505 | 0.0103 | 2.0 | 1188 | 1515 | Waxy, strong odor | 0.34 | 22.2 | 65 | 0.9309 | — | — | — | — |
| 506 | 0.0257 | 5.0 | 1253 | 1864 | Waxy, strong odor | 0.19 | 17.2 | 91 | 0.9298 | — | — | — | — |
| 507 | 0.0514 | 10.0 | 496 | 654 | Waxy, strong odor | 0.27 | 31.0 | 117 | 0.9284 | 236 | 3.4 | 68.8 | 2.67 |

[a] Solid polymer recovered from reactor.
[b] Total ethylene consumed.

TABLE 6

Diphenylsilane with Oxidized and Reduced Catalysts

| | Silane | | Productivity[a] | Count[b] Productivity | | | | | Density |
|---|---|---|---|---|---|---|---|---|---|
| Run | (mmoles) | (ppm) | (g/g-hr) | (g/g-hr) | Comments | MI | HLMI | HLMI/MI | (g/cc) |
| 601 | 0 | 0 | 2326 | 2326 | No olefins | 0.026 | 4.7 | 181 | 0.9606 |
| 602 | 0.00163 | 0.5 | 747 | 864 | Slight olefin odor | 0.015 | 1.7 | 112 | 0.9585 |
| 603 | 0.0032 | 1.0 | 3012 | 3041 | Slight olefin odor | 0.014 | 3.4 | 248 | 0.9427 |
| 604 | 0.0065 | 2.0 | 1636 | 1941 | Waxy, strong olefin odor | 0.14 | 12.0 | 80 | 0.9312 |
| 605 | 0.0165 | 5.0 | 543 | 941 | Waxy, strong olefin odor | 0.33 | 42.0 | 126 | 0.9278 |

[a] Solid polymer recovered from reactor.
[b] Total ethylene consumed.

EXAMPLE 7

Table 7 shows the advantageous use of phenylsilane and an oxidized and reduced catalyst to polymerize ethylene.

TABLE 7

Phenylsilane with Oxidized and Reduced Catalysts

| | Silane | | Productivity[a] | Count[b] Productivity | | |
|---|---|---|---|---|---|---|
| Run | (mmoles) | (ppm) | (g/g-hr) | (g/g-hr) | Comments | MI |
| 701 | 0 | 0 | 2326 | 2326 | — | 0.026 |
| 702 | 0.0027 | 0.5 | 3172 | 3196 | Some olefin odor | 0.027 |
| 703 | 0.00554 | 1.0 | 1462 | 1735 | Strong odor | 0.132 |
| 704 | 0.011 | 2.0 | 406 | 776 | Waxy, strong olefin odor | 0.61 |
| 705 | 0.0277 | 5.0 | 198 | 370 | Waxy, strong olefin odor | — |

| | | | Density | SEC | | | IV |
|---|---|---|---|---|---|---|---|
| Run | HLMI | HLMI/MI | (g/cc) | $Mw \times 10^3$ | $Mn \times 10^3$ | HI | (dl/g) |
| 701 | 4.7 | 181 | 0.9606 | 230 | 15.3 | 15.1 | 2.32 |
| 702 | 3.3 | 123 | 0.9463 | — | — | — | — |

TABLE 7-continued

| | | Phenylsilane with Oxidized and Reduced Catalysts | | | | | |
|---|---|---|---|---|---|---|---|
| 703 | 10.3 | 78 | 0.9436 | — | — | — | — |
| 704 | 65.2 | 107 | 0.9290 | 165 | 2.7 | 62.1 | 2.13 |
| 705 | — | — | 0.9181 | 126 | 1.5 | 84.7 | 1.89 |

[a]Solid polymer recovered from reactor.
[b]Total ethylene consumed.

EXAMPLE 8

Use of n-hexylsilane and an oxidized and reduced catalyst also resulted in the desired effects, as given in Table 8.

TABLE 8 n-Hexylsilane with Oxidized and Reduced Catalysts

| | Silane | | Productivity[a] | Count[b] Productivity | | | | Density |
|---|---|---|---|---|---|---|---|---|
| Run | (mmoles) | (ppm) | (g/g-hr) | (g/g-hr) | Comments | MI | HLMI | HLMI/MI | (g/cc) |
| 801 | 0 | 0 | 2326 | 2326 | No odor | 0.026 | 4.7 | 181 | 0.9606 |
| 802 | 0.00258 | 0.5 | 2218 | 2299 | No odor | 0.025 | 2.55 | 102 | 0.9514 |
| 803 | 0.00516 | 1.0 | 3130 | — | Strong olefin odor | 0.058 | 4.9 | 84 | 0.9354 |
| 804 | 0.00774 | 1.5 | 2571 | 2628 | Strong olefin odor | 0.058 | 5.5 | 95 | 0.9386 |
| 805 | 0.0103 | 2.0 | 1963 | 2234 | Strong olefin odor | 0.227 | 20.3 | 90 | 0.9330 |
| 806 | 0.0155 | 3.0 | 1079 | 1402 | Strong olefin odor | 0.596 | 64.1 | 108 | 0.9278 |
| 807 | 0.0206 | 4.0 | 844 | 1276 | Strong olefin odor | 0.26 | 33.3 | 128 | 0.9326 |
| 808 | 0.0258 | 5.0 | 522 | 935 | Strong olefin odor | 0.176 | 38.8 | 221 | 0.9331 |

[a]Solid polymer recovered from reactor.
[b]Total ethylene consumed.

EXAMPLE 9

Silanes with high molecular weights also produce the desired effects. Table 9 shows the results from using polymethylhydrogen siloxane and an oxidized and reduced catalyst.

TABLE 9

Poly(methylhydrogen) Siloxane with Oxidized and Reduced Catalysts

| Run | Silane (ppm) | Productivity[a] (g/g-hr) | Count[b] Productivity (g/g-hr) | Comments | MI | HLMI | HLMI/MI | Denisty (g/cc) |
|---|---|---|---|---|---|---|---|---|
| 901 | 0 | 2326 | 2326 | No odor | 0.026 | 4.7 | 181 | 0.9606 |
| 902 | 0.5 | 825 | — | No odor | 0 | 1.95 | — | 0.9567 |
| 903 | 0.7 | 751 | — | No odor | 0 | 1.39 | — | 0.9557 |
| 904 | 1.0 | 3112 | — | No odor | 0.0083 | 1.39 | 168 | 0.9507 |
| 905 | 2.5 | 2666 | 2713 | Slight odor | 0.014 | 1.62 | 116 | 0.9467 |
| 906 | 5.0 | 2103 | 2400 | Strong odor | 0.059 | 5.90 | 100 | 0.9394 |
| 907 | 7.5 | 785 | 1066 | Strong odor | 0.596 | 64.1 | 108 | 0.9278 |

[a]Solid polymer recovered from reactor.
[b]Total ethylene consumed.

EXAMPLE 10

The data in Table 10 give examples and the results of using silanes with the formula SiR4, i.e., no Si—H bonds. These data show that silanes containing no Si—H bonds have no effect, other than to poison the catalyst.

TABLE 10

Silanes Containing No Si—H Groups with Oxidized and Reduced Catalysts

| | | Silane | | Productivity[a] | | | | | Density |
|---|---|---|---|---|---|---|---|---|---|
| Run | Silane | (mmoles) | (ppm) | (g/g-hr) | Comments | MI | HLMI | HLMI/MI | (g/cc) |
| 1001 | None | 0 | 0 | 2326 | No olefins | 0.026 | 4.7 | 181 | 0.9606 |
| 1002 | Dimethyldiethoxysilane | 0.00202 | 0.5 | 359 | No olefins | 0.0068 | 1.2 | 174 | 0.9556 |
| 1003 | Dimethyldichlorosilane | 0.0023 | 1.0 | 594 | No olefins | 0.012 | 1.5 | 124 | 0.9550 |
| 1004 | Hexamethyldisiloxane | 0.00185 | 0.5 | 906 | No olefins | 0.02 | 2.2 | 107 | 0.9535 |
| 1005 | Hexamethyldisiloxane | 0.0037 | 1.0 | 853 | No olefins | 0.02 | 2.9 | 161 | 0.9525 |
| 1006 | Hexamethyldisilane | 0.00205 | 0.5 | 1398 | No olefins | 0.0067 | 1.1 | 162 | 0.9541 |
| 1007 | Hexamethyldisilane | 0.0041 | 1.0 | 660 | No olefins | 0.012 | 1.1 | 92 | 0.9541 |
| 1008 | Triethylethoxysilane | 0.00254 | 0.5 | 1022 | No olefins | 0.0 | 1.6 | — | 0.9553 |
| 1009 | Triethylethoxysilane | 0.00508 | 1.0 | 377 | No olefins | 0.016 | 2.04 | 127 | 0.9556 |
| 1010 | Triethylchlorosilane | 0.00199 | 0.5 | 484 | No olefins | 0.0 | 1.87 | — | 0.9573 |
| 1011 | Triethylchlorosilane | 0.00398 | 1.0 | 86 | No olefins | — | — | — | — |
| 1012 | Methyldiethoxysilane | 0.00223 | 0.5 | 557 | No olefins | 0.018 | 2.13 | 118 | 0.9575 |
| 1013 | Methyldiethoxysilane | 0.00447 | 1.0 | 84 | No olefins | — | — | — | — |
| 1014 | Tetraethysilane | 0.00416 | 1.0 | 928 | No olefins | 0.019 | 2.7 | 142 | 0.9585 |
| 1015 | Tetraethysilane | 0.00832 | 2.0 | Trace | No olefins | — | — | — | — |
| 1016 | Tetramethylsilane | 0.0034 | 0.5 | 1515 | No olefins | 0.0 | 1.8 | — | 0.9563 |
| 1017 | Tetramethylsilane | 0.0051 | 0.75 | 1324 | No olefins | 0.0085 | 1.2 | 141 | 0.9564 |
| 1018 | Tetramethylsilane | 0.0068 | 1.0 | 322 | No olefins | 0.005 | 1.33 | 265 | 0.9559 |

[a]Solid polymer recovered from reactor.

EXAMPLE 11

Using a 23 gallon (87 liter), 6 inch (15.2 cm) loop reactor, diethylsilane was added to the catalyst feed stream using a precontacting vessel. The catalyst used was similar to that in Examples 3-10, however the oxidation temperature was about 650° C. Catalyst and silane were precontacted at ambient temperature for approximately 10 minutes before introduction into the reactor at 82° C. The polymerization time was for about 75 minutes. Three levels of silane were used to produce three different polymers.

TABLE 11

| Run | ppm Silane* | Density (g/cc) |
|---|---|---|
| 1101 | 0.10 | 0.951 |
| 1102 | 0.25 | 0.946 |
| 1103 | 0.50 | 0.935 |

*Based on isobutane feed rate.

The reactor isobutane was sampled at the time when the lowest density of resin was made and analyzed by GC analysis. Oligomers, principally 1-hexene, were found in the reactor. Other olefins were also detected, in the ratio $C_4/C_6/C_8$ of 2:4:1 with a long tail of higher olefins to $C_{22}$.

While this invention has been described in detail for the purpose of illustration, it is not to be construed or limited thereby. This detailed description is intended to cover all changes and modifications within the spirit and scope thereof.

That which is claimed is:

1. A process comprising simultaneously producing olefins and polymerizing olefins using a catalyst comprising:
    (a) contacting a silane of the formula $SiH_4$,
    (b) with a previously oxidized catalyst system comprising chromium supported on a refractory metal oxide.

2. A process according to claim 1 wherein said oxidation occurs in an oxygen-containing atmosphere at a temperature within the range of about 400° to about 900° C.

3. A process according to claim 1 wherein said refractory metal oxide is selected from the group consisting of silica, titania, alumina, boria, magnesia, thoria, zirconia, and mixtures thereof.

4. A process according to claim 1 wherein at least a part of said chromium is in the hexavalent state.

5. A process according to claim 1 wherein said catalyst system comprises from about 0.05 to about 5 weight percent chromium, based on the weight of the total catalyst system.

6. A process according to claim 1 wherein said polymerization is carried out at a temperature within the range of about 85° to about 110° C.

7. A process according to claim 1 wherein said olefin is ethylene.

8. A process comprising simultaneously producing olefins and polymerizing olefins using a catalyst comprising:
    (a) contacting poly(methylhydrogen)siloxane or a silane compound of the formula $R_{4-n}SiH_n$, wherein n=1, 2, 3, or 4 and R is chosen form aliphatic and aromatic radicals of 1 or more carbon atoms;
    (b) with a previously oxidized, cooled and subsequently carbon monoxide reduced catalyst system, wherein said catalyst system is subjected to no further oxidation, and wherein said catalyst system comprises chromium supported on a refractory metal oxide.

9. A process according to claim 8 wherein said silane is a compound selected from the group consisting of ethylsilane, diethylsilane, triethylsilane, phenylsilane, diphenylsilane, triphenylsilane, n-hexylsilane, poly(methylhydrogen) siloxane, and mixtures thereof.

10. A process according to claim 8 wherein said oxidation occurs in an oxidizing atmosphere at a temperature within the range of about 400° to about 900° C. and said reduction takes place at a temperature within the range of about 300° to about 500° C.

11. A process according to claim 8 wherein said refractory metal oxide is selected from the group consisting of silica, titania, alumina, boria, magnesia, thoria, zirconia, and mixtures thereof.

12. A process according to claim 8 wherein at least a part of said chromium is in the divalent state.

13. A process according to claim 8 wherein said catalyst system comprises from about 0.05 to about 5 weight percent chromium, based on the weight of the total catalyst system.

14. A process according to claim 8 wherein said catalyst ssytem is suitable for simultaneously producing olefins and olefin polymer of controlled density.

15. A process according to claim 8 wherein said polymerization is carried out at a temperature within the range of about 66° to about 110° C.

16. A process according to claim 8 wherein said olefin is ethylene.

17. A process to simultaneously produce olefins and polymerize ethylene using a catalyst comprising:
    (a) contacting silane, of the formula $SiH_4$,
    (b) with a catalyst system comprising chromium supported on a refractory metal oxide selected from the group consisting of silica, titania, alumina, and mixtures thereof;
    wherein said catalyst system has been previously oxidized at a temperature within the range of about 400° to about 900° C., such that at least a portion of the chromium is in the hexavalent state.

18. A process according to claim 17 wherein said polymerization is carried out at a temperature within the range of about 85° to about 110° C.

19. A process to simultaneously produce olefins and polymerize ethylene using a catalyst comprising:
    (a) contacting poly(methylhydrogen)siloxane or a silane compound of the formula $R_{4-n}SiH_n$, wherein n=1, 2, 3, or 4 and R is chosen from aliphatic and aromatic radicals or one or more carbon atoms,
    (b) with a catalyst system comprising chromium supported on a refractory metal oxide selected from the group consisting of silica, titania, alumina, and mixtures thereof;
    wherein said catalyst system has been previously oxidized at a temperature within the range of about 400° C. to about 900° C., such that at least a portion of the chromium is in the hexavalent state, cooled and subsequently reduced in the presence of carbon monoxide at a temperature within the range of about 300° to about 500° C. and is subjected to no further oxidation, such that at least a substantial portion of the chromium is in the divalent state; and wherein said catalyst system is suitable for simultaneously producing olefins and ethylene polymer of controlled polymer density.

20. A process according to claim 19 wherein said polymerization is carried out at a temperature within the range of about 85° to about 110° C.

* * * * *

UNITED STATES PATENT AND TRADEMARK OFFICE
CERTIFICATE OF CORRECTION

PATENT NO. : 5,171,801

DATED : December 15, 1992

INVENTOR(S) : Shirley J. Martin et al.

It is certified that error appears in the above-identified patent and that said Letters Patent is hereby corrected as shown below:

Col. 16, claim 14, line 23, delete "ssystem" and insert --- system ---, therefor.

Signed and Sealed this

Nineteenth Day of April, 1994

Attest:

BRUCE LEHMAN

Attesting Officer

Commissioner of Patents and Trademarks